United States Patent [19]

Cavenagh

[11] 4,301,690
[45] Nov. 24, 1981

[54] GEAR SHIFTING MEANS

[76] Inventor: Paul D. Cavenagh, 495 Newbury St., Danvers, Mass. 01923

[21] Appl. No.: 100,387

[22] Filed: Dec. 5, 1979

[51] Int. Cl.³ .................. F16H 3/08; F16D 21/04; F16D 43/02
[52] U.S. Cl. ................... 74/363; 74/333; 74/337.5
[58] Field of Search .............. 74/333, 337.5, 363; 192/20, 37, 48.91, 71, 96

[56] References Cited

U.S. PATENT DOCUMENTS

| | | | |
|---|---|---|---|
| 1,223,862 | 4/1917 | Eaton | 192/71 X |
| 1,564,667 | 12/1925 | Guild | 74/333 |
| 2,049,103 | 7/1936 | Baumgartner | 74/363 |

Primary Examiner—Allan D. Herrmann
Attorney, Agent, or Firm—C. Yardley Chittick

[57] ABSTRACT

A gear shifting mechanism comprising a drive shaft with a plurality of freely rotatable gears mounted thereon and means for making driving connection between the drive shaft and any one of the gears. Then through the operation of means actuated by limited reverse rotation of the drive shaft, the connection of the drive shaft is shifted to a second gear while the first gear is released. The shifting of the connection of the drive shaft successively to all of the other gears is accomplished in the same manner, namely, by stopping the drive shaft and reversing its rotation through a limited angle which movement actuates means for connecting the next gear to the drive shaft while releasing the previously connected gear. This procedure is continuously repeated, shifting the connection with the drive shaft progressively through all of the gears in a predetermined sequence and then returning the connection to the first gear.

8 Claims, 15 Drawing Figures

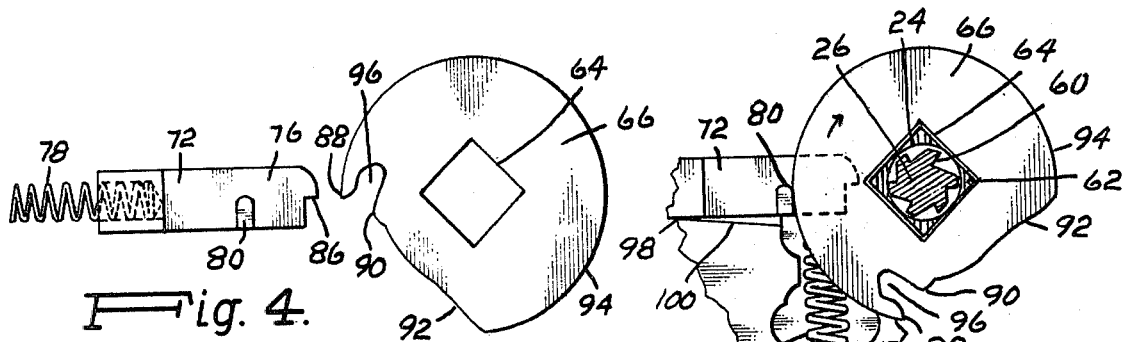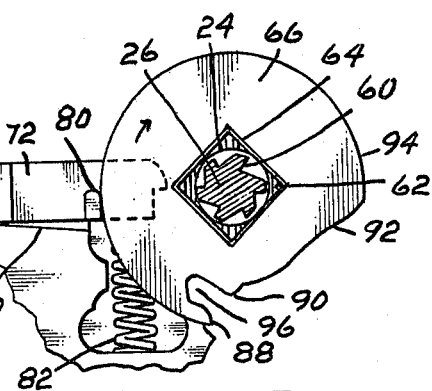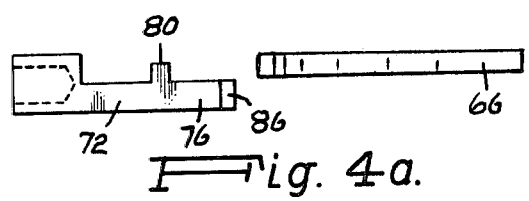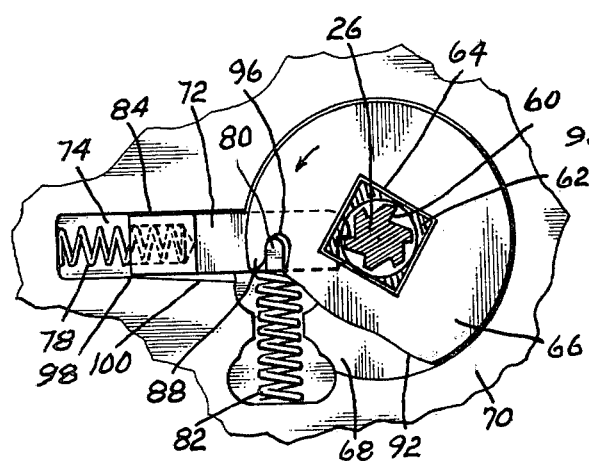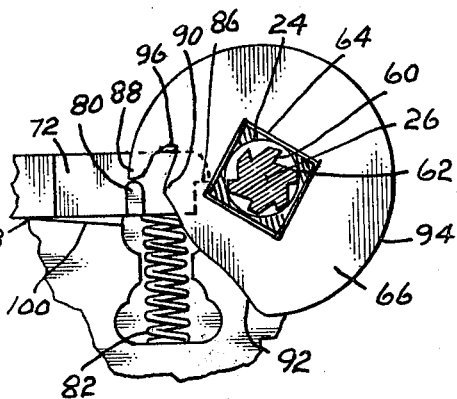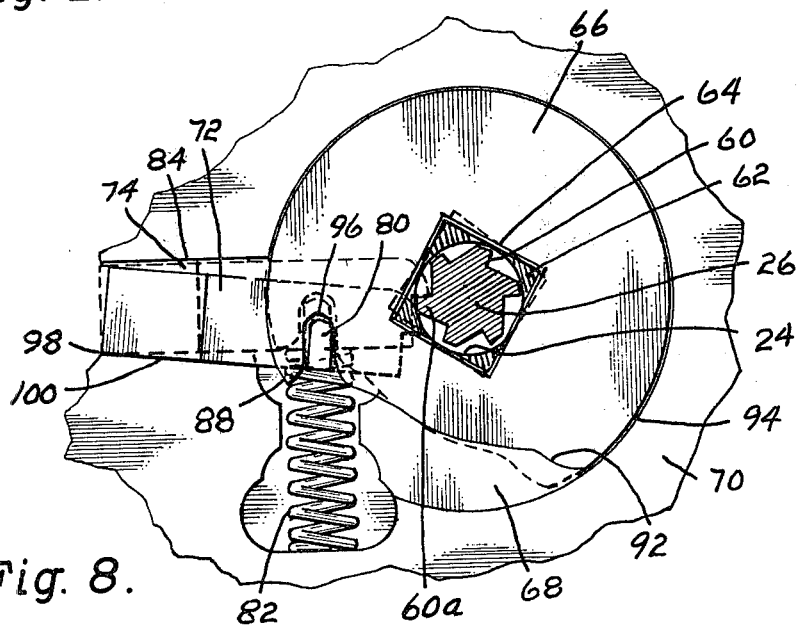

U.S. Patent  Nov. 24, 1981  Sheet 3 of 3  4,301,690
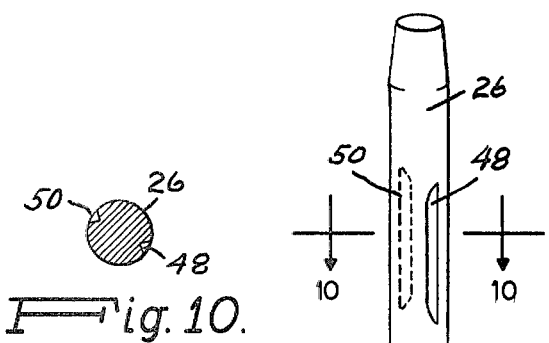
Fig. 10.
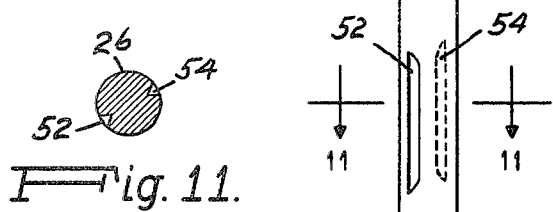
Fig. 11.
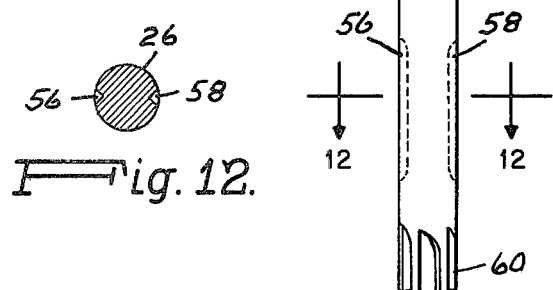
Fig. 12.
Fig. 9.
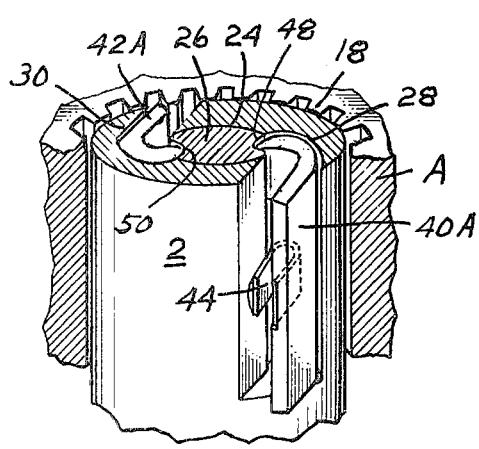
Fig. 13.
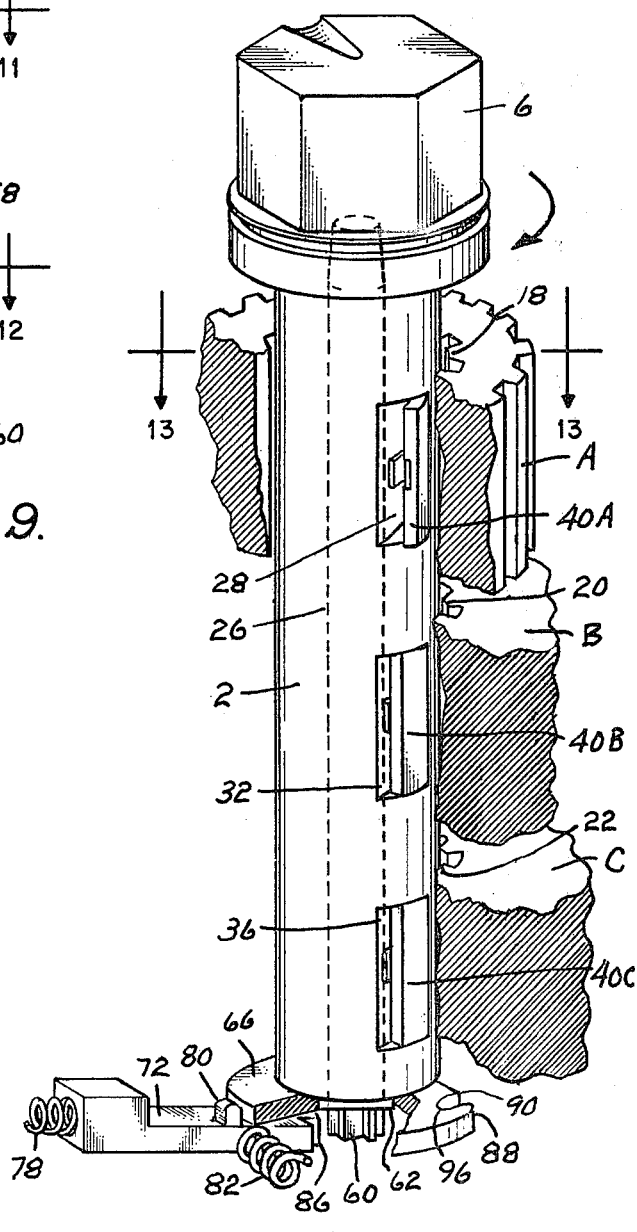
Fig. 14.

GEAR SHIFTING MEANS

BACKGROUND OF THE INVENTION

Means for shifting gears for changing the ratios of rotation between a drive shaft and a driven shaft are old and well known. In some constructions, the drive shaft and the driven shaft must be stopped before the gears are shifted. In other constructions, the drive shaft may be rotating and the driven shaft may be rotating or stationary when the shifting occurs. In other prior art structures, a drive shaft having freely rotatable gears mounted thereon may be temporarily connected to any one of the gears through the actuation of internal engaging means. In most constructions, the operator may select the next gear ratio he wishes to use with the mechanism passing through neutral from the previously used ratio.

SUMMARY OF THE PRESENT INVENTION

Shifting of gears in the present invention requires that the driving shaft be stopped and then placed in reverse rotation through a limited angle. This reverse movement of the drive shaft causes operation of mechanism which frees the gear that had been in driving connection with the drive shaft and at the same time puts the next gear (in an ordered sequence of gears) into driving connection with the drive shaft. This procedure of shifting the connection from gear to gear continues until all gears have been connected to the drive shaft after which the connection automatically returns to the first gear. The shifting procedure is then repeated as required.

The mechanism used to make driving connection between the drive shaft and any selected gear thereon is shown in the U.S. Pat. No. 3,599,937. In this patent which is concerned with a manually operated winch, the gear shifting means is manually rotated with one hand while the winch handle is held stationary with the other.

In the present invention which is of broader application in that the gearing and the means for shifting gears may be used wherever changing power ratios are desired, the gear shifting means is actuated through a controlled rotation of the gear shift shaft through a predetermined angle induced by rotation of the drive shaft in the reverse direction.

If the present invention were used with a winch for example of the type shown in U.S. Pat. No. 3,599,937 above referred to, the operator could effect a gear change through the use of one hand only, by stopping clockwise rotation of the handle and then moving the handle counterclockwise through as little as about 15° and never more than 360°. The sailor's other hand could then remain in control of the line on the winch.

If the present invention were used in a setting in which the driven element had rotating momentum, the gear shifting could be accomplished without stopping the driven element because of the over-running capability of the driving gear on the stopped and reversed drive shaft.

The invention will be better understood as the description proceeds with the aid of the accompanying drawing in which FIG. 1 is a section view of the invention showing a plurality of gears mounted on a drive shaft and the means for actuating the gear changing means at the lower end of the drive shaft.

FIG. 4 is a plan view showing separately in non-cooperating positions the shift arm and the cam that actuates the shift arm.

FIG. 4a is a side elevation of the parts shown in FIG. 4.

FIG. 5 is a view, partly in section, taken on the line 5—5 of FIG. 1.

FIGS. 6 and 7 are views similar to FIG. 5 with the shift arm in different positions as determined by the angular position of the cam.

FIG. 8 is an enlarged view similar to FIG. 7, but showing the movement of the shift arm induced by counterclockwise movement of the cam.

FIG. 9 is a perspective view of the shift shaft removed from the drive shaft.

FIG. 10 is a section taken on the line 10—10 of FIG. 9.

FIG. 11 is a section taken on the line 11—11 of FIG. 9.

FIG. 12 is a section taken on the line 12—12 of FIG. 9.

FIG. 13 is a section taken on the line 13—13 of FIG. 14.

FIG. 14 is a perspective view of the drive shaft, the gear shifting means broken away in part and the gears, broken away, on the drive shaft.

DESCRIPTION OF A PREFERRED EMBODIMENT

Figure 1:
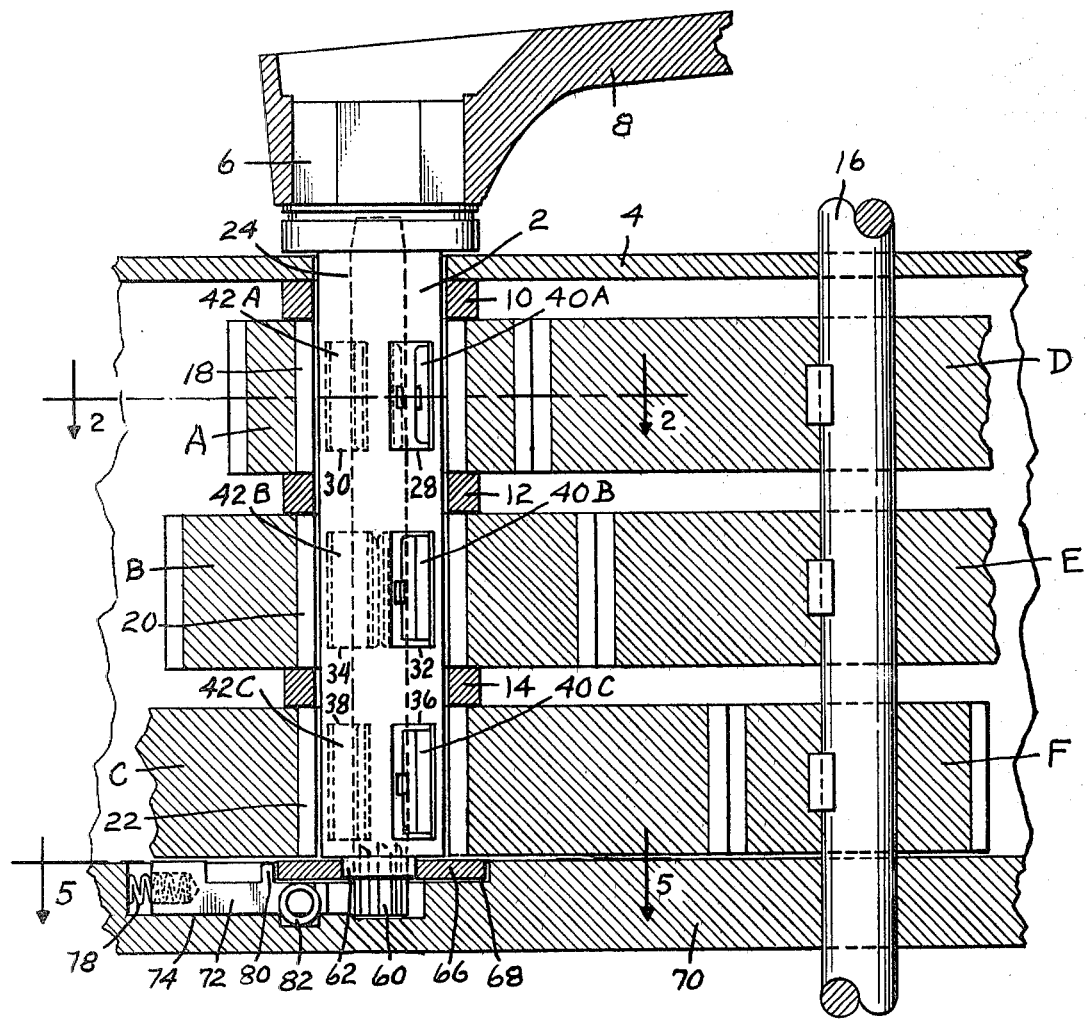

Referring first to FIG. 1, there is shown a drive shaft 2 mounted for rotation in any suitable structure such as a gear box 4. The upper end of shaft 2 has a hexagonal head 6 adapted to receive a manually operated crank 8 whereby the shaft may be rotated. It is to be understood however that any other suitable or desired means for rotating drive shaft 2 could be used such as, for example, an electric motor.

Mounted on drive shaft 2 are a plurality of gears which for convenience in disclosure are three in number and are indicated at A, B and C, it being understood however that in principle, there is no limitation on the number of gears that may be controlled by the herein disclosed gear shifting mechanism. These gears are maintained in fixed axial positions on drive shaft 2 by any suitable means. If it is preferred that the gears be separated, then spacers 10, 12 and 14 could be used. For simplicity in illustration, the precision bearings that would normally be used to support drive shaft 2 in the gear box or other structure have been omitted. The addition of such bearings would be an obvious mechanical procedure to those skilled in this art.

The gears A, B and C may be of any desired size and may be arranged to coact with other gears to cause rotation or movement of other elements. In FIG. 1, gears A, B and C are shown in operating engagement with gears D, E and F mounted on and keyed to shaft 16.

Gears A, B and C are normally unconnected with drive shaft 2. However, means is provided for making driving connection between drive shaft 2 and any one of the three gears and for shifting the driving connection as desired from gear A to gear B to gear C and then back to gear A. Alternatively, the driving connection to the gears could follow a different order, namely, from gear A to gear C to gear B and then back to gear A.

The means for making driving connection is shown in FIGS. 1, 2, 3, 9, 13 and 14.

Each of gears A, B and C has internal teeth or other equivalent structure shown at 18 in gear A, at 20 in gear B and at 22 in gear C. Drive shaft 2 has an axially extending cylindrical bore 24 therein in which is positioned a cylindrical shift shaft 26. Shift shaft 26 while fitting closely within bore 24 is freely rotatable about its longitudinal axis.

Figure 2:
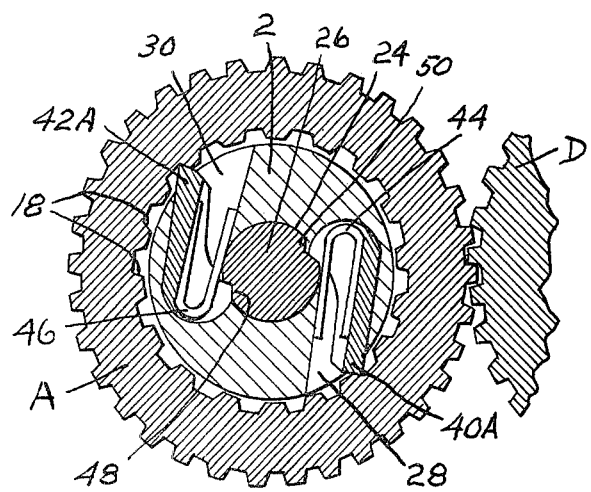
FIG. 2 is a section taken on the line 2—2 of FIG. 1 showing the pawls in engagement with the interior teeth on the related gear.
Figure 3:
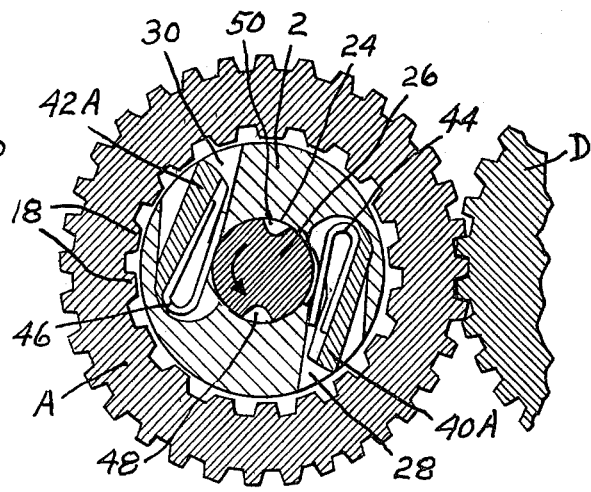
FIG. 3 is also a section taken on the line 2—2 of FIG. 1 showing the pawls in retracted position to free the related gear from the drive shaft.

Located in the drive shaft 2 and within the confines of gears A, B and C are apertures 28 and 30, 32 and 34 and 36 and 38 respectively. These apertures extend completely through the drive shaft wall. Each aperture has therein a pivotally mounted pawl, two of which are shown in FIGS. 2, 3 and 13 at 40A and 42A in apertures 28 and 30. The pawls 40A and 42A, urged outwardly by springs 44 and 46, are shown extended in FIG. 2 and retracted in FIG. 3. The position of the pawls is controlled by longitudinally extending grooves in shift shaft 26. These grooves are shown collectively in FIG. 9 and appear individually in FIGS. 2 and 3. When the pawls are extended as in FIG. 2, driving connection is made between drive shaft 2 and gear A. When the pawls are retracted as in FIG. 3, gear A is free to rotate on drive shaft 2.

As can be seen in FIGS. 1 and 14, the apertures 28, 32 and 36 are longitudinally aligned on drive shaft 2 and the apertures 30, 34 and 38, 180° away on the opposite side of the drive shaft are also aligned. Thus by proper angular positioning of the pawl control grooves in shift shaft 26 only one pair of pawls can be extended at a time so that the drive shaft can only be connected with one gear at a time.

Referring to FIGS. 9, 10, 11 and 12, the grooves 48 and 50 control the pawls that are related to gear A. The grooves 52 and 54 that control the pawls related to gear B are 60° away from grooves 48 and 50. Grooves 56 and 58 that control the pawls related to gear C are 60° away from grooves 52 and 54 and 120° away from grooves 48 and 50.

Thus, as can be seen in FIGS. 2 and 13, when shift shaft 26 is rotated to the position shown so that grooves 48 and 50 can receive the inner ends of pawls 40A and 42A, the pawls will be extended to drivingly engage the interior of gear A. At this position of shift shaft 26, the grooves 52, 54 and 56, 58 will not be positioned to receive the inner ends of the pawls within gears B and C and hence gears B and C remain in freely rotating condition on drive shaft 2.

When it is desired to shift the driving connection to another gear, shift shaft 26 is rotated counterclockwise through an angle of 60° with respect to drive shaft 2. This will bring control grooves 52 and 54 to a position to receive the inner ends of the pawls 40B and 42B related to gear B whereby these pawls will be extended to make driving connection between drive shaft 2 and the teeth 20 on the interior of gear B. At the same time, grooves 48 and 50 will move to the position shown in FIG. 3 causing retraction of the pawls 40A and 42A and disengagement of drive shaft 2 from gear A. At this time, gear C also remains disengaged from drive shaft 2.

If it is now desired to shift the driving connection to gear C, then shift shaft 26 is again rotated counterclockwise through an additional 60° angle which will bring the grooves 56 and 58 to a position to receive the inner ends of the pawls 40C and 42C related to gear C. Thus these pawls are extended to engage gear C. In the meanwhile, gear B has been disconnected and gear A has remained disconnected.

When the gear connection is next shifted by rotating shift shaft 26 another 60°, the drive shaft will then be connected to gear A and the sequence of connections thereafter will be repeated.

In the foregoing explanation of the means for connecting the drive shaft 2 selectively to the gears A, B or C, the use of two pawls has been disclosed. It will be understood however that the shaft 2 can be equally well placed in driving connection with each gear through the use of only one pawl. Thus in connecting shaft 2 to gear A, one of the pawls 40A or 42A may be omitted; in connecting shaft 2 to gear B, one of the pawls 40B or 42B may be omitted; and in connecting shaft 2 to gear C, one of the pawls 40C or 42C may be omitted. It has been found that the use of a single pawl is usually adequate to carry the load to be imposed on the gears.

MEANS FOR CAUSING ROTATION OF SHIFT SHAFT

In the preceding description, no explanation was given as to how the step by step rotation of the shift shaft 26 with respect to the drive shaft 2 was accomplished.

The mechanism that achieves this result is an important feature of the invention and will now be explained.

Reference is made to FIGS. 1, 4, 4a, 5, 6, 7, 8, 9 and 14.

The lower end of shift shaft 26 has six teeth formed therein. These teeth are indicated in elevation at 60 in FIG. 1, in perspective in FIG. 9 and in cross section in FIGS. 5, 6, 7 and 8.

The lower end of drive shaft 2 terminates in a short end portion 62 having a square exterior somewhat larger than the diameter of the bore 24. This square end portion is shown in side elevation in FIGS. 1 and 14 and in section in FIGS. 5, 6, 7 and 8.

End portion 62 fits within a square opening 64 in a cam 66 of novel configuration. As shown in FIGS. 1, 7 and 8 cam 66 rests in a circular depression 68 in the base 70 where it is free to be rotated by rotation of drive shaft 2. The direction of driving rotation of drive shaft 2 is clockwise as indicated by the curved arrow in FIG. 14.

Cam 66 is in permanent connection with drive shaft 2 and therefore is responsive to any rotational movement of the drive shaft. The configuration of the cam is used to control the movement of a shift arm 72 which is located in a groove 74 of such depth that the end 76 of shift arm 72 is positioned below cam 66 and in alignment with teeth 60. Shift arm is constantly urged to the right by spring 78, its movement being limited by the engagement of the upstanding follower 80 against the wall of cam 66.

A second spring 82 normally holds shift arm 72 against the wall 84 of groove 74 but the pressure of spring 82 does not impair the ability of the shift arm to slide longitudinally under the force of spring 78.

The right hand end of shift arm 72, as best shown in FIGS. 4 and 4a terminates in a tooth engager 86, whose location is constantly under the control of cam 66 and the follower 80.

Referring now particularly to FIGS. 5 and 6, it will be assumed that drive shaft 2 is in driving connection with gear A by means of the extended pawls 40A and 42A (see FIG. 2) whose inner ends are in the grooves 48 and 50 of shift shaft 26. Under such conditions, cam 66 will be continuously rotating clockwise driven by the square end portion 62 of drive shaft 2. Shift shaft 26 is likewise turning with the drive shaft being held in relative fixed position by the engagement of pawls 40A and 42A with grooves 48 and 50.

Spring 78 forces shift arm 72 to the right to hold follower 80 against cam 66. As rotation continues, the cam finger 88 passes follower 80 allowing the shift arm to be instantly moved to the right to bring follower 80 into engagement with cam shoulder 90. This movement is accompanied by an audible click which advises the operator of the angular position of the cam at that instant. When follower 80 is against shoulder 90 tooth engager 86 on the end of the shift arm will not have reached the nearest tooth 60 so there is no interference with the continued rotation of shift shaft 26.

As rotation of cam 66 continues, follower 80 will be gradually moved to the left by cam surface 92 to bring the follower to its maximum left position where it rides on the circular wall 94 of the cam.

The foregoing back and forth movement of shift arm 72 is repeated with each revolution of drive shaft 2 and cam 66. The angular position of shift shaft 26 with respect to drive shaft 2 remains unchanged.

When the operator decides to shift the driving connection of drive shaft 2 from gear A to gear B, the procedure is as follows.

Rotation of drive shaft 2 is stopped. Rotation of the drive shaft is reversed but rotation of gear A is not reversed. The pawls 40A and 42A carried by the drive shaft spring inwardly as they move counterclockwise over the internal teeth 18 of gear A. Shift shaft 26 likewise turns counterclockwise remaining in fixed angular relation with the drive shaft 2 until cam 66 and the associate means cause shift shaft 26 to rotate counterclockwise through an additional angle with respect to the drive shaft. Regardless of the angular position of the cam 66 when rotation stopped, reverse rotation of not more than 360° will cause follower 80 to enter cam pocket 96 as shown in FIG. 7. With the follower 80 in this position, tooth engager 86 will overlie the adjacent tooth 60a of shift shaft 26.

Reverse rotation of drive shaft 2 and cam 66 is continued causing follower 80 and its attached shift arm 72 to be pivoted clockwise through an angle of about 6°, about the pivot point 98. This pivoting motion is limited by engagement of shift arm 72 with the wall 100 of groove 74.

As this pivoting movement of shift arm 72 takes place, tooth engager 86 pressing against tooth 60a causes shift shaft 26 to rotate 60° counterclockwise with respect to cam 66 and drive shaft 2. The result is that the grooves 48 and 50 move away from the inner ends of pawls 40A and 42A causing retraction of the pawls and disengagement from gear A. Simultaneously grooves 52 and 54 are positioned to receive the inner ends of pawls 40B and 42B causing extension of these pawls to put drive shaft 2 in driving connection with gear B.

Clockwise rotation of the drive shaft may then be resumed with the power output passing through gear B.

In shifting from gear B to gear C, the same procedure is followed. This results in shift shaft 26 being rotated another 60° counterclockwise with respect to drive shaft 2 to bring grooves 56 and 58 into cooperation with pawls 40C and 42C. This results in the extension of these pawls into engagement with gear C while at the same time pawls 40B and 42B are being retracted to disengage gear B from the drive shaft. Through this stage of operation, pawls 40A and 42A remain retracted so that gear A remains disengaged.

From the foregoing explanation, it will be apparent that this gear shifting construction is especially desirable when the driving power is manual. The operator hears the click on each revolution of the crank as the follower falls off cam finger 88 to hit shoulder 90. When shifting gears is desired, he may immediately reverse rotation of the drive shaft after hearing the click. Then by a rotation of the crank through a relatively small angle brought to a halt by engagement of member 72 with wall 100, gear shifting takes place quickly and positively. As previously stated however, operation of the drive shaft is not limited to manual operation.

As previously noted, the number of gears on the drive shaft is not limited to three. As the number of gears is varied the angular positions of the grooves in shift shaft 26 must be correspondingly changed along with a corresponding change in the number of teeth 60 and an appropriate shift in the angle through which tooth engager 86 is moved. On the other hand, reverse rotation of the drive shaft may be started at any angular position with the follower 80 guided by cam 66 into pocket 96 after reverse rotation of cam 66 limited to not more than about 360°.

The teeth 60 on the shift shaft might take other forms so long as they are engageable to be rotated by the tooth engager 86 or its equivalent.

The above disclosure will suggest to others equivalent structure which will be within the scope of the following claims.

I claim:
1. A tubular shaft,
a cylindrical shaft within and concentric with said tubular shaft,
means for maintaining said shafts in fixed relation when said tubular shaft is rotated in one direction,
means for limiting rotation of said tubular shaft in the opposite direction to not more than one revolution,
and means actuated by said limited rotation of said tubular shaft in the said opposite direction to cause said cylindrical shaft to rotate through a predetermined additional angle in said opposite direction with respect to said tubular shaft.
2. A tubular shaft,
a cylindrical shaft within and concentric with said tubular shaft,
means for maintaining said shafts in fixed relation when said tubular shaft is rotated in one direction,
means actuated by limited rotation of said tubular shaft in the opposite direction to cause said cylindrical shaft to rotate through a predetermined angle with respect to said tubular shaft,
said actuating means comprising a cam connected to said tubular shaft, teeth on said cylindrical shaft and a movable member controlled by said cam for engaging and turning said teeth through said predetermined angle when said tubular shaft is rotated in said opposite direction.
3. The structure set forth in claim 2,
said rotation of said cylindrical shaft being in the same direction as the limited rotation of said tubular shaft.

4. The structure set forth in claim 2,
said tubular shaft having a plurality of freely rotating gears mounted thereon, means carried by said tubular shaft for making driving connection with a selected gear,
and means on said cylindrical shaft for controlling the actuation of said driving connection means.

5. The structure set forth in claim 2,
said member being slidable back and forth under the influence of a spring and said cam but maintained by said cam free of engagement with said teeth when said tubular shaft is turning in said one direction,
said cam structure when rotated in said opposite direction causing said member to engage one of said teeth and then to move said member to cause rotation of said one tooth through said predetermined angle.

6. Gear shifting means comprising
a drive shaft mounted for rotation in a supporting frame,
a shift shaft within said drive shaft,
means for rotating said drive shaft in one direction,
means for reversing the direction of rotation of said drive shaft,
means for limiting said reverse rotation of said drive shaft to not more than about one revolution,
a plurality of gears mounted on said shaft in fixed axial position but normally unconnected rotationally to said shaft,
means including said shift shaft for successively and in predetermined sequence connecting each said gear to said drive shaft in driving relation while simultaneously disconnecting a previously connected gear, and
means actuated by said limited reverse rotation of said drive shaft to cause predetermined angular rotation of said shift shaft in said reverse direction beyond the limited angular rotation of said drive shaft whereby said connecting and disconnecting means are operated.

7. The gear shifting means set forth in claim 6,
said means for causing limited rotation of said shift shaft comprising a cam on said drive shaft,
teeth on said shift shaft, and a cam controlled and actuated movable member adapted to engage said teeth and rotate said shift shaft through said predetermined angle when said drive shaft and cam are rotated in said reverse direction.

8. The gear shifting means set forth in claim 6,
the means for connecting said shaft to each individual gear comprising an opening through the side of said drive shaft within the confines of said gear, a pawl pivoted within said opening, means urging said pawl to move outwardly of said drive shaft, grooves in said shift shaft which when brought into alignment with part of said pawl by said reverse rotation of said drive shaft will permit said pawl to move outwardly,
said gear having teeth about its inner circumference adapted to be engaged by said pawl when moved outwardly whereby driving connection between said shaft and gear is established.

* * * * *

UNITED STATES PATENT AND TRADEMARK OFFICE
CERTIFICATE OF CORRECTION

PATENT NO. : 4,301,690
DATED : November 24, 1981
INVENTOR(S) : Paul D. Cananagh

It is certified that error appears in the above—identified patent and that said Letters Patent is hereby corrected as shown below:

On the title page, the inventor's name in two places is incorrectly spelled as "Cavenagh". The spelling is hereby corrected to -- Cavanagh --.

Signed and Sealed this

Sixteenth Day of February 1982

[SEAL]

Attest:

GERALD J. MOSSINGHOFF

Attesting Officer     Commissioner of Patents and Trademarks